Figure 5:
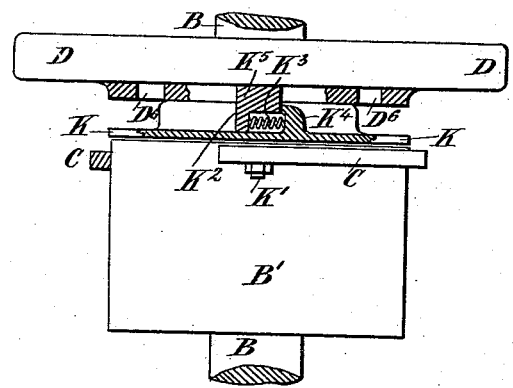

(No Model.) 2 Sheets—Sheet 1.
W. H. LINDSAY.
FRICTION CLUTCH.
No. 532,162. Patented Jan. 8, 1895.
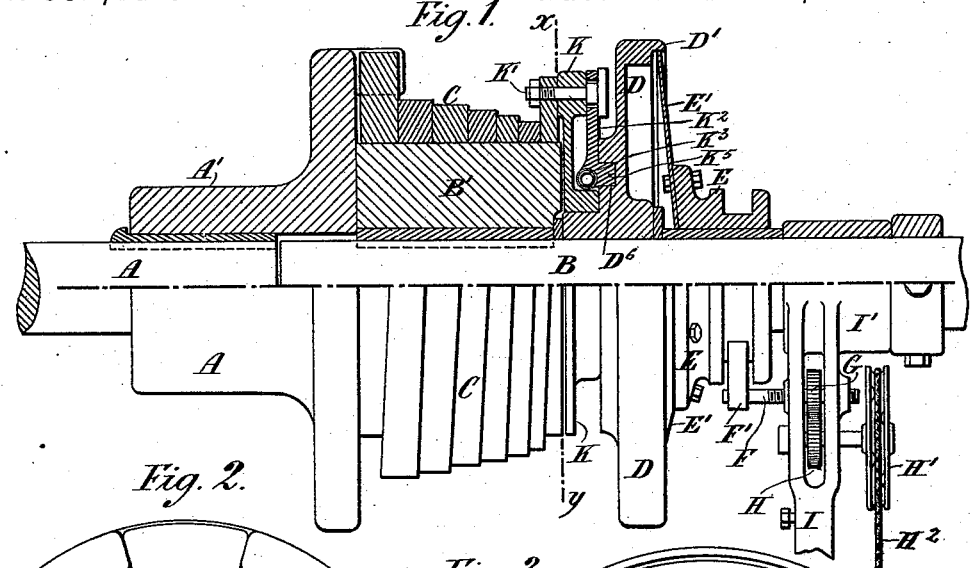
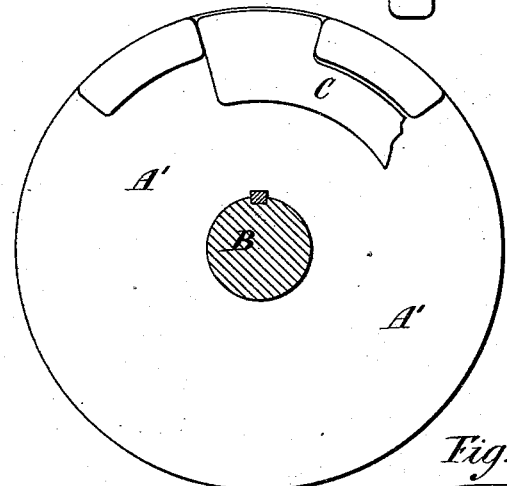
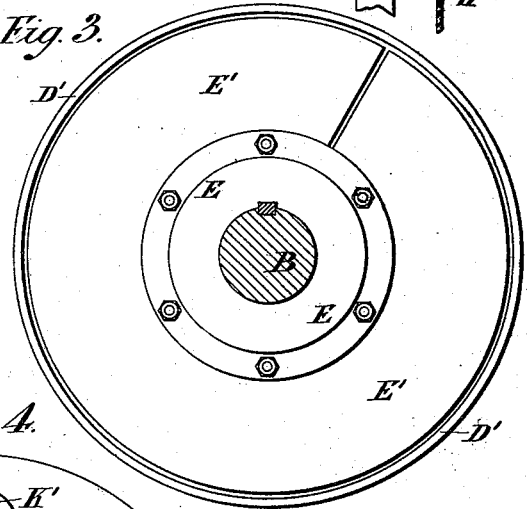
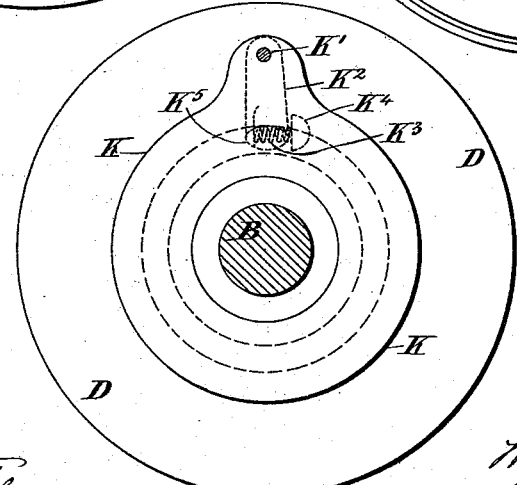
Witnesses.
B. W. Miller
C. W. Brooke
Inventor.
William H. Lindsay,
By his Attorneys,
Baldwin Davidson Wight (No Model.) 2 Sheets—Sheet 2.

W. H. LINDSAY.
FRICTION CLUTCH.

No. 532,162. Patented Jan. 8, 1895.

Witnesses
B. W. Miller
C. W. Brooke

Inventor
William H. Lindsay
By his Attorneys,
Baldwin, Davidson & Wight

UNITED STATES PATENT OFFICE.

WILLIAM HENRY LINDSAY, OF BRISTOL, ENGLAND.

FRICTION-CLUTCH.

SPECIFICATION forming part of Letters Patent No. 532,162, dated January 8, 1895.

Application filed February 15, 1894. Serial No. 500,227. (No model.)

*To all whom it may concern:*

Be it known that I, WILLIAM HENRY LINDSAY, manager, a subject of the Queen of Great Britain, residing at The Shaw Engineering Works, Ashton Gate, Bristol, England, have invented certain new and useful Improvements in Friction-Clutches or Power-Transmitters, of which the following is a specification.

According to this invention I construct in the manner herein described a friction clutch or power transmitter for acting as a loose coupling to the abutting ends of two shafts which are in a line with each other.

In the drawings annexed I have shown examples of clutches constructed as above described.

Figure 6:
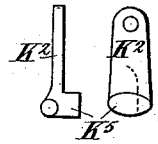
Figure 7:
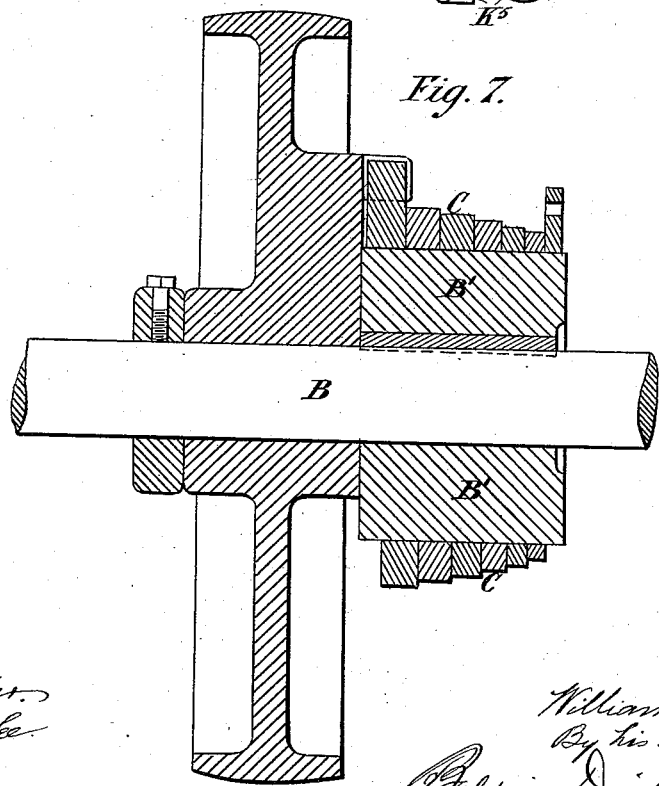

Figure 1 is a side elevation the upper half in section of the clutch adapted for acting as a fast and loose coupling to the ends of two shafts. Figs. 2, 3, and 4 are cross sections of the same. Fig. 5 is a plan partly in section of the pawl mechanism for holding the end of the spring coil fast with the loose disk. Fig. 6 shows separate views of the pawl $K^2$. Fig. 7 is a vertical section of the coil clutch mechanism adapted for coupling a driving wheel to the shaft on which it is mounted.

In Figs. 1 to 4 A is a revolving shaft and B a shaft to be made fast or loose with it.

B' is a cylindrical boss fast on the shaft B.

C is a coil made from a bar of spring metal surrounding the boss B' but normally out of contact with it. Its thicker end is secured as shown at Fig. 2 to a disk A' keyed on the shaft A. Its thinner end is secured by a bolt K' to a disk K, which can turn freely around the boss of a disk D which can itself turn freely around the shaft B. When the disk K is revolved in one direction it becomes locked to the disk D, in the manner hereinafter described, so that the disk D revolves with it but the disks are free from each other whenever the revolution of the disk K is arrested while the disk D continues to revolve.

E' is a dished disk slit radially as shown in Fig. 3 fixed to the collar E. The collar may be slid endwise of the shaft by any suitable mechanism. Preferably I form a groove around the collar for a projection F' from a screw rod F to enter. The screw rod screws into a pinion G which can be revolved in either direction by a pinion H on which is a wheel H' of larger diameter over which passes an endless rope or chain $H^2$. The bearings of the pinions G and H are carried by an arm I which projects downward from a collar I' which fits loosely around the shaft B but which is as the drawings show prevented from moving endwise along it. By pulling the cord or chain downward on one or other side of the wheel H' the collar E will be moved in one or other direction along the shaft B. When the collar E is moved toward the disk D and the outer edge of the disk E' is thereby brought against the side of this disk all further movement of the collar then tends to flatten the disk E' and cause its circumference to bear very forcibly against the inner circumference of a cylindrical rim D' which stands out from the side of the disk D. When this takes place the disk D is securely locked to the collar and so to the shaft B and if the shaft A is revolving in its proper direction the spring coil will be further wound—that is, the number of coils in it will be increased and it will then grip the solid boss B' and the two shafts will revolve together. When the shafts are to be disengaged from each other the collar E is moved away from the disk D and when the disk E' no longer bears against this disk the spring coil again expands and releases its hold of the boss B'.

If the clutch were to be used for coupling a driving wheel to a shaft that carries it, a driving wheel mounted upon and capable of turning freely around the shaft B would be substituted for the disk A' and shaft A as shown in Fig. 7.

$K^2$ is a pawl free to turn around the stem of the bolt K'. On the end of the pawl is an oval projection $K^5$ which enters a groove $D^6$ cut concentrically around the face of the disk D. A small coiled spring $K^3$ tends to turn the pawl in the same direction that it would tend to be turned by the revolution of the disk K. When the disk D is loose on the shaft B it revolves around it together with the disk K, but so soon as the disk D is locked by the light friction clutch to the shaft B and is thereby retarded the oval projection at the end of the pawl $K^2$ gets set into an inclined position across the groove $D^6$ and so the disk K gets firmly locked to the disk D and consequently the spring coil becomes wound tightly around the cylindrical boss B' and thereby locks the shaft A to the shaft B so that the shaft B revolves with it. Should the shaft A at any time be stopped and B continue to revolve by its momentum the pawl would tend to be shifted in the opposite direction but when turned in this direction it is prevented from getting jammed in the groove by a fixed stop or lug K⁴ on the disk K which prevents the pawl moving in this direction beyond a position radially to the axis, and consequently when turned in this direction the pawl cannot get locked in the groove.

What I claim is—

1. The combination of the shaft B, the cylindrical boss B' fixed thereto, disks or wheels A' and D, in proximity to the two ends of the boss, and both capable of turning concentrically with the axle B, a disk K, a pawl K² carried thereby, and having a projection K⁵ which enters an annular groove formed concentrically around the face of the disk D, a coiled spring C surrounding the boss, fixed at one end to the disk or wheel A', and connected at the other end to the disk K, and means for locking the disk D to the axle B.

2. The combination of a shaft, a cylindrical boss B' secured thereto, a spring encircling the boss and connected at one end to rotate with the shaft, a disk K to which the other end of the spring is secured and which is loosely mounted on the shaft, a disk D encircling the shaft and having an annular groove concentric with the shaft, a pawl pivoted to the disk K and having a projection entering the grooved disk D, and means for connecting the disk D to the shaft.

WILLIAM HENRY LINDSAY.

Witnesses:
ROBERT B. RANSFORD,
WILMER M. HARRIS.